350-276 CROSS REFERENCE SEARCH ROOM

April 14, 1964 B. J. MILLER 3,129,285

TELEVISION RECEIVER

Filed June 14, 1961

INVENTOR
Bertrand J. Miller
BY John J. Pederson
ATTORNEY

United States Patent Office 3,129,285
Patented Apr. 14, 1964

3,129,285

TELEVISION RECEIVER

Bertrand J. Miller, Mount Prospect, Ill., assignor to Zenith Radio Corporation, a corporation of Delaware Filed June 14, 1961, Ser. No. 117,038
5 Claims. (Cl. 178—7.82)

This invention relates to television receivers and the like.

One of the major problems confronting television receiver manufacturers for many years has been that of reducing or overcoming undesired ambient light reflections from the face plate of the picture tube and/or from the glass safety plate superimposed thereover. Several different approaches to this problem have been made, with varying degrees of success.

One approach which has been used, particularly with respect to the face plate of the picture tube itself, has been that of creating a matte finish by sandblasting, hydrofluoric acid etching, or the like, to reduce specular reflection. While such techniques have been moderately successful in achieving the desired objective, they are accompanied by an inherent deterioration in picture quality caused by diffusion of the light spots originating on the fluorescent screen.

Another expedient which has been employed in an effort to reduce the interference from undesired ambient light reflections from the glass safety plate has been that of tilting the safety plate downwardly to direct ambient light reflections outside the normal field of view. This expedient has had the desired effect of substantially reducing the interference attributable to undesired ambient light reflections from the glass safety plate, but of course it has no effect upon such reflections originating at the curved glass face plate of the television picture tube itself. Moreover, it is not generally feasible to eliminate reflections from the picture tube face plate by tilting the tube, for the reason that the curvature of such face plates is generally segmento-spherical; hence the amount of tilt required to cant the uppermost portion of the viewing screen downwardly is impractically great. One expedient which has ben used to overcome this difficulty has been to form the television tube face plate of cylindro-segmental configuration, with substantially cylindrical curvature relative to a vertical axis, to permit tilting of the entire tube for the elimination of ambient light reflections; this approach, while effective to achieve the desired purpose, has not been generally adopted in the industry because of the difficulty and expense involved in providing a cylindrically curved face plate of sufficient strength to provide adequate protection against implosion, particularly in the larger tube sizes.

Accordingly it is a principal object of the present invention to provide a new and improved television receiver in which undesirable manifestations of ambient light reflection are substantially eliminated.

It is a further object of the invention to achieve substantial elimination of interference from ambient light reflection without detracting from the quality of the reproduced image, and without requiring the use of unduly impractical or expensive picture tube bulb configurations.

Still another expedient which has been described in the published literature, but is not believed to have been employed in commercially produced television receivers, is a construction in which the flat glass safety plate is bonded to the face plate of the picture tube by an optical cement having the same index of refraction as the glass of which the face plate and the safety plate are composed. This construction has presented the disadvantage of materially restricting the permissible viewing angle; unless the reproduced image is viewed from within a relatively small area substantially directly in front of the receiver, the prism effect encountered in the peripheral areas are such that the lateral edge portions of the reproduced image are effectively obliterated from view—an effect which, for lack of a better term, may be referred to as "vignetting."

Still another object of the invention, therefore, is to achieve substantial elimination of ambient light reflection with a bonded safety plate construction while avoiding undesirable vignetting effects.

A television receiver constructed in accordance with the present invention comprises a cabinet having a generally rectangular frontal opening. A cathode-ray picture tube is enclosed in the cabinet and has a generally rectangular glass face plate in juxtaposition with the frontal opening in the cabinet, the face plate having substantial horizontal-plane and vertical-plane curvature. A glass safety plate having no substantial vertical-plane curvature is bonded to the glass face plate by transparent means having substantially the same index of refraction as the glass face plate and the glass safety plate, and the picture tube is tilted forwardly and downwardly with the front surface of the safety plate at an acute angle with the vertical dimensions of the cabinet, whereby internal ambient light reflections are substantially eliminated and external ambient light reflections are directed downwardly out of the normal viewing field.

In accordance with another aspect of the invention, a new and improved television picture tube comprises a fluorescent screen supported on a glass face plate of segmento-spherical configuration, and a glass safety plate of cylindro-segmental configuration bonded to the face plate by transparent means having substantially the same index of refraction as the glass face plate and the glass safety plate.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

Figure 1:
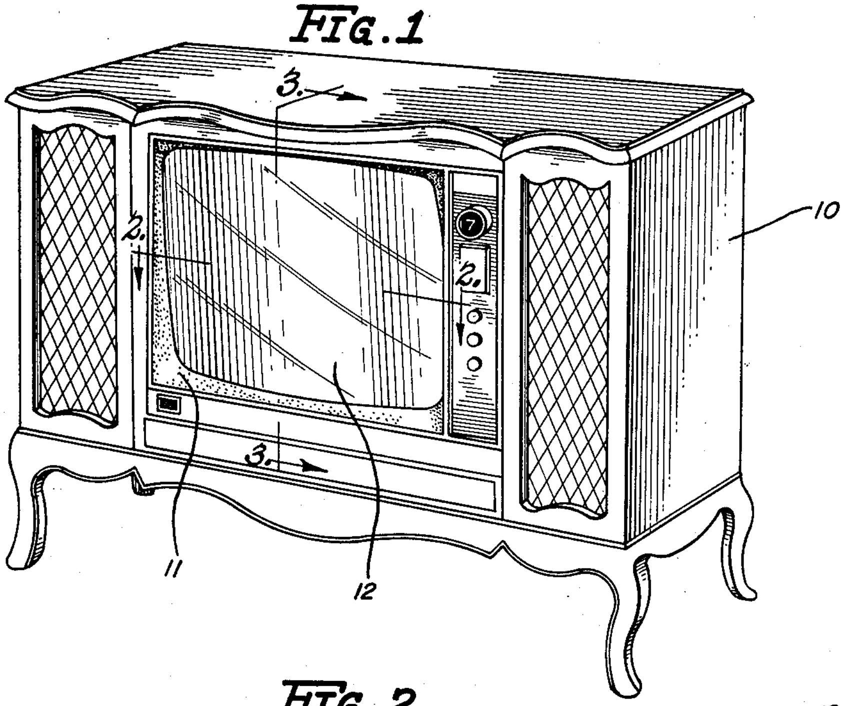
FIGURE 1 is a perspective view of a television receiver embodying the present invention.
Figures 2, 3:
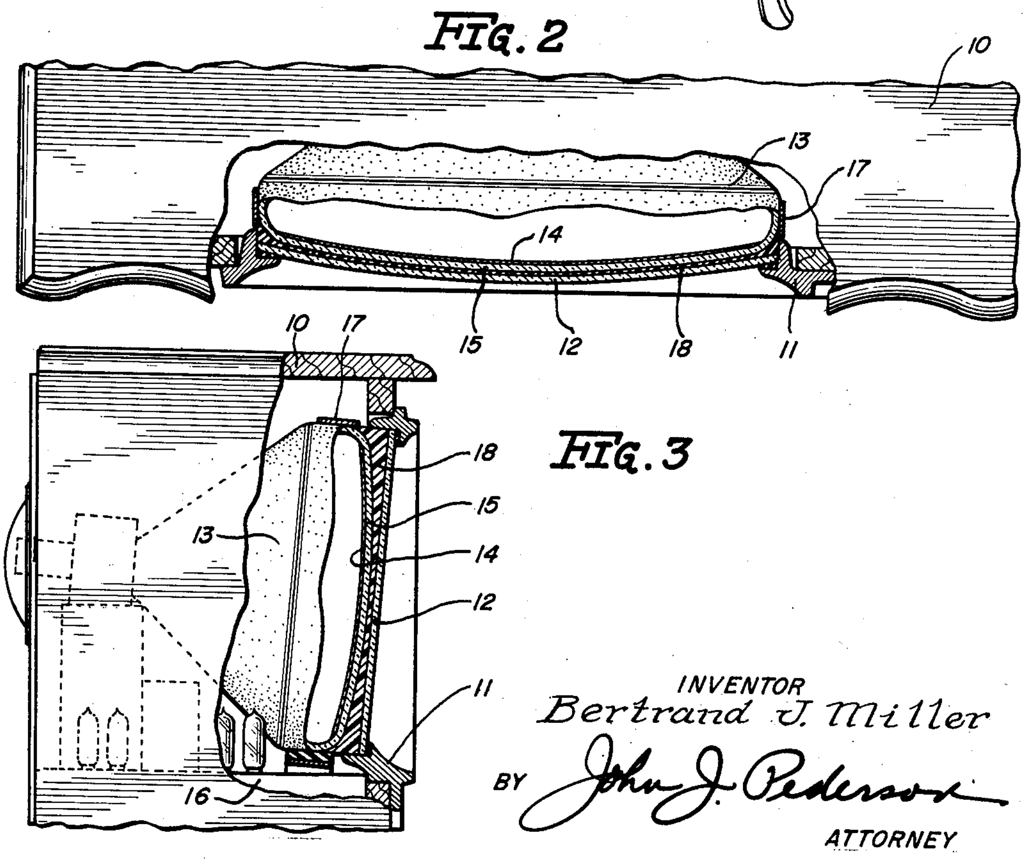
FIGURE 2 is a fragmentary top view, partly cut away, and partly in section, along line 2—2 of FIGURE 1.
FIGURE 3 is a fragmentary side view, partly cut away and partly in section along the line 3—3 of FIGURE 1.

The television receiver of FIGURE 1 comprises a cabinet 10 provided with an escutcheon 11 having a generally rectangular frontal opening which is occupied by the front surface of a glass safety plate 12 which overlies the viewing screen of a conventional cathode-ray tube 13 (FIGURES 2 and 3). As shown in FIGURES 2 and 3, cathode-ray tube 13 comprises a fluorescent screen 14 supported on a generally rectangular glass viewing screen 15 having substantial horizontal-plane curvature (see FIGURE 2) and vertical-plane curvature (see FIGURE 3); in the preferred and usual construction, glass viewing screen 15 is formed as a segment of a sphere, i.e., of segmento-spherical configuration. Cathode-ray tube 13 is mounted on a television chassis 16 by means of a clamp 17 which engages the enlarged bulb portion of picture tube 13 and maintains the tube in a position tilted forwardly and downwardly with the front surface of safety plate 12 at an acute angle with the vertical dimensions of cabinet 10.

Glass safety plate 12 has no substantial vertical-plane curvature (see FIGURE 3) and is preferably of cylindro-segmental configuration, with the cylindrical axis oriented parallel to the smaller characteristic dimension of the rectangular glass face plate 15. In the preferred embodiment described, safety plate 12 is bonded to face plate 15 of picture tube 13 by transparent means having substantially the same index of refraction as the glass face plate and the glass safety plate. The construction is such that the entire interspace between glass face plate 15 and glass safety plate 12 is filled with material of the same index of refraction as the glass of which the face plate and safety plate are composed. In the preferred construction, the interposed transparent material 18 consists of an optical cement such as an epoxy resin such as Dow Corning Co. D.E.R. 741 resin or a polyester type resin such as that marketed by Pittsburgh Plate Glass Co. under the brand name "Selectron."

With this construction, internal reflections—i.e., reflections originating at the inner surface of safety plate 12 and/or at the outer surface of face plate 15—are eliminated because the interposition of transparent material 18 of the same index of refraction as the glass members effectively eliminates the reflecting surfaces themselves. Reflections from the outermost surface of the glass safety plate 12 are deflected downwardly out of the normal viewing field, because of the tilting or canting forward of the entire assembly in the cabinet. Accordingly, the undesirable effects of both internal and external reflections of ambient light are eliminated, and moreover this is accomplished without in any way interfering with the polished glass surfaces; hence there is no deterioration of the reproduced image.

As a further advantage, cathode-ray tube 13 employs a bulb of entirely conventional configuration, including the segmento-spherical face plate which affords the maximum resistance to implosion. The preferred construction employing the cylindro-segmental safety plate 12 minimizes the vignetting effect by reducing the composite thickness of the safety plate-face plate assembly in the side edge regions, so that there is no substantial restriction imposed upon the viewing angle. Moreover, the construction possesses all of the advantages attributable to bonded safety plate tubes. Finally, the construction presents a materially flattened appearance to the reproduced image, and lends itself to novel design treatment.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A television receiver comprising: a cabinet having a generally rectangular frontal opening; a cathode-ray picture tube enclosed in said cabinet and having a generally rectangular glass face plate in juxtaposition with said frontal opening, said face plate having substantial horizontal-plane and vertical-plane curvature; a uniform-thickness clear glass safety plate, having no substantial vertical-plane curvature, bonded to said glass face plate by transparent means having substantially the same index of refraction as said glass face plate and said glass safety plate; and said picture tube being tilted forwardly and downwardly with the front surface of said safety plate at an acute angle with the vertical dimensions of said cabinet, whereby internal ambient light reflections are substantially eliminated and external ambient light reflections are directed downwardly out of the normal viewing field of said receiver.

2. A television receiver comprising: a cabinet having a generally rectangular frontal opening; a cathode-ray picture tube enclosed in said cabinet and having a generally rectangular glass face plate in juxtaposition with said frontal opening, said face plate having substantial horizontal-plane and vertical-plane curvature; a glass safety plate, having substantial horizontal-plane curvature but no substantial vertical-plane curvature, bonded to said glass face plate by transparent means having substantially the same index of refraction as said glass face plate and said glass safety plate; and said picture tube being tilted forwardly and downwardly with the front surface of said safety plate at an acute angle with the vertical dimensions of said cabinet, whereby internal ambient light reflections are substantially eliminated and external ambient light reflections are directed downwardly out of the normal viewing field of said receiver.

3. A television picture tube comprising a fluorescent screen supported on a glass face plate of segmento-spherical configuration, and a glass safety plate of cylindro-segmental configuration bonded to said face plate by transparent means having substantially the same index of refraction as said glass face plate and said glass safety plate.

4. A television picture tube comprising a fluorescent screen supported on a generally rectangular glass face plate of segmento-spherical configuration, and a glass safety plate of cylindro-segmental configuration bonded to said face plate by transparent means having substantially the same index of refraction as said glass face plate and said glass safety plate, the cylindrical axis of said safety plate being substantially parallel to the smaller characteristic dimenison of said rectangular face plate.

5. A television picture tube comprising: a fluorescent screen supported on a segmento-spherical glass face plate; a cylindro-segmental glass safety plate in juxtaposition with said face plate; and transparent means, comprising optical cement and having substantially the same index of refraction as said face plate and said safety plate, filling the interspace therebetween.

References Cited in the file of this patent

UNITED STATES PATENTS

| | | |
|---|---|---|
| 2,346,810 | Young | Apr. 18, 1944 |
| 2,728,012 | Swedlund | Dec. 20, 1955 |
| 2,977,412 | Rhodes | Mar. 28, 1961 |